United States Patent [19]

Kathiresan et al.

[11] Patent Number: 5,199,096
[45] Date of Patent: Mar. 30, 1993

[54] STEAM-RESISTANT CABLE SUCH AS STEAM-RESISTANT OPTICAL FIBER CABLE

[76] Inventors: Krishnaswamy Kathiresan, 2544 Morgan Lake Dr., Marietta, Ga. 30066; Andrew J. Panuska, 5936 Islandview Dr., Buford, Ga. 30518; Manuel R. Santana, 2175 River Cliff Ct., Roswell, Ga. 30076

[21] Appl. No.: 785,602
[22] Filed: Oct. 30, 1991
[51] Int. Cl.$^5$ .............................. G02B 5/14; G02B 6/44
[52] U.S. Cl. ................................................. 385/109
[58] Field of Search ........................ 385/107, 109, 114

[56] References Cited

U.S. PATENT DOCUMENTS

| | | | |
|---|---|---|---|
| 4,078,853 | 3/1978 | Kempf et al. | 385/114 |
| 4,109,099 | 8/1978 | Dembiak et al. | 174/107 |
| 4,896,940 | 1/1990 | Kathiresan et al. | 350/96.23 |
| 4,974,926 | 12/1990 | Blee et al. | 385/107 |
| 5,000,539 | 3/1991 | Gareis | 385/109 |

OTHER PUBLICATIONS

McKay, et al., *Qualification Procedure For Fiber Optic Cable Design*, Int. Wire & Cable Symposium Proceedings 1986, pp. 307–313.

*Primary Examiner*—Akm E. Ullah
*Attorney, Agent, or Firm*—E. W. Somers; D. E. Hayes, Jr.

[57] ABSTRACT

A steam-resistant optical fiber cable (20) includes a core (21) comprising a plurality of optical fiber ribbons (22,22) disposed within a tubular member (30) comprised of a high temperature resistant material. The tubular member is disposed within a hermetic sealing member (40) which comprises a metal of low electrochemical activity having a sealed seam. An outer jacket (50) is disposed about the hermetic sealing member and in a preferred embodiment is characterized by resistance to degradation in high temperature, high humidity environments. The core may be unfilled or filled with a waterblocking material and in a preferred embodiment, a waterblocking member is interposed between the tubular member and the hermetic sealing member.

25 Claims, 2 Drawing Sheets

STEAM-RESISTANT CABLE SUCH AS STEAM-RESISTANT OPTICAL FIBER CABLE

TECHNICAL FIELD

This invention relates to a steam-resistant cable such as a steam-resistant optical fiber cable. More particularly, this invention relates to an optical fiber cable which is capable of resisting damage when exposed to a high temperature, high moisture, high velocity steam environment.

BACKGROUND OF THE INVENTION

In metropolitan areas it is not uncommon to run communications cable in underground ducts which are located adjacent to steam lines. The operating condition of the steam varies generally from 0.7 MPa (100 psig) to 2.8 MPa (400 psig). The corresponding minimum temperature of the steam, which is higher if superheated, varies from 165° C. (328° F.) to 230° C. (445° F.).

The rupture of underground steam piping is of great concern to telecommunication operating companies. Optical fiber cables placed in the neighborhood of steam pipes are vulnerable to damage and failure when there is a steam leak or when a pipe ruptures. When a high pressure steam pipe ruptures, adjacent optical fiber cable is exposed to a high temperature, high moisture, and high velocity environment. The values, of course, depend on the distance between the location of the rupture in the steam pipe and the cable. It is estimated from field data that the maximum steam temperature to which the cables may be exposed when there is a steam pipe leak or rupture could be as high as 140° C. (284° F.). The duration of exposure could be as long as a few months. Currently available commercial optical fiber cables have been found to fail in such an environment. The failures are not surprising because cables presently made were not designed for such an environment. The high temperature, high moisture, and high velocity environment degrades or melts the cable materials, resulting in the failure of optical fibers over a period of time.

Because steam may have an adverse affect on the communications cable, it is incumbent upon cable manufacturers to provide a cable having a sheath system which is capable of preventing damage to optical fiber when the cable is in service adjacent to steam piping. The primary considerations for a steam-resistant optical fiber cable are the high temperature and high moisture conditions. These conditions relate directly to the basic high temperature and hydrolytic stability performance of the cable materials. A sheath system of optical fiber cable suitable for use adjacent to steam lines must be such as to meet the high temperature and high humidity conditions. The high velocity condition is more closely related to the structural integrity and mechanical performance of the cable, and should be used as a secondary design consideration of the cable.

In the past, polyethlene-jacketed, lead-shielded cables were used in steam environments. Not only was this arrangement very costly, but the outer layer of polyethylene, when exposed to high temperatures for a long period of time, tended to melt or to develop cracks. Cables having a polyethylene jacket extruded over a soldered seam steel shield also have been used. However, in cables of this latter construction, the soldered seam generally has not been continuous.

In one steam-resistant, metallic conductor cable, a corrugated metallic layer surrounds a core and an extruded covering of polymeric materials surrounds the metallic layer. The extruded covering includes an inner jacket which is intimate contact with the metallic layer and which is interposed between the metallic layer and an outer jacket extruded over and in intimate contact with the inner jacket. The outer jacket is constructed of a material which is capable of withstanding exposure to temperatures of at least 100° C. (212° F.) and the material of the inner jacket has a notch sensitivity substantially less than that of the material of the outer jacket to maintain substantially the structural integrity of the cable notwithstanding corrugation imprint thereof by the metallic layer. Further, the inner jacket has a thickness which is at least slightly greater than the depth of the corrugations of the metallic layer.

What is needed and what seemingly does not appear to be available in the prior art is a steam-resistant optical fiber cable which is capable of providing reliable transmission notwithstanding exposure to a high temperature, high humidity and high velocity steam environment. Of course, such an optical fiber cable must not have an unduly large diameter and must be reasonable in cost.

SUMMARY OF THE INVENTION

The foregoing problems of the prior art have been overcome by the cable of this invention. A steam-resistant cable such as an optical fiber cable includes a core comprising at least one optical fiber transmission medium and a first tubular member in which is disposed the core and which comprises a plastic material which resists degradation when exposed to relatively high temperatures. A second tubular member is disposed about the first tubular member and comprises a metallic material having a relatively low chemical or electrochemical reactivity. An outer jacket comprising a plastic material is disposed about the second tubular member.

In a preferred embodiment, a filling composition of matter is disposed in the core to provide a waterblocking function. Also, in the preferred embodiment, a waterblocking member such as a yarn or tape which includes a superabsorbent polymeric material is interposed between the first and the second tubular members.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
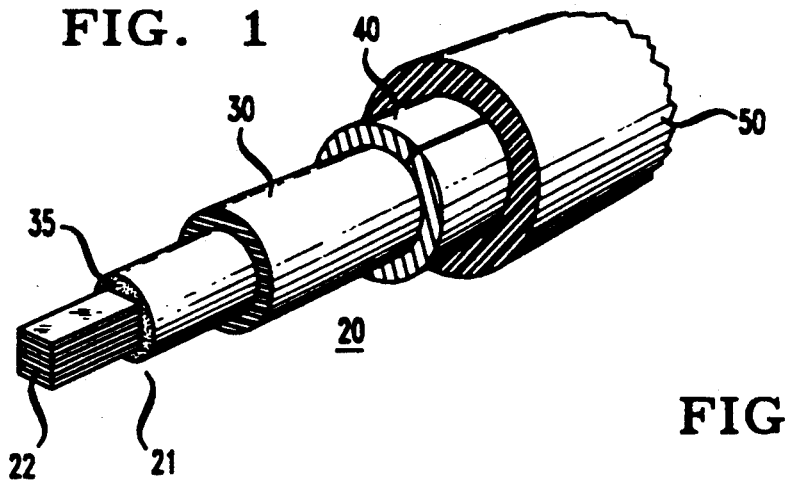
FIG. 1 is a perspective view of a steam-resistant cable.
Figure 2:
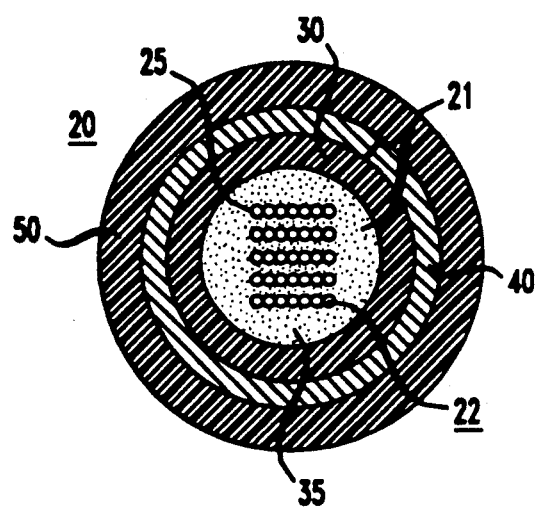
FIG. 2 is an end cross-sectional view of the cable of FIG. 1.

Referring now to FIGS. 1 and 2, there is shown an optical fiber cable which is designated generally by the numeral 20. The optical fiber cable includes a core 21 which includes at least one optical fiber. In the embodiment shown, the core includes one or more optical fiber ribbons 22-22 which are undulated. Each optical fiber ribbon comprises a plurality of optical fibers 25-25 which are disposed in a planar array and held together by a matrix material. See U.S. Pat. No. 4,900,126 which issued on Feb. 13, 1990 in the names of K. W. Jackson, G. A. Lochkovic, P. D. Patel, M. L. Pearsall and J. R. Petisce and which is incorporated by reference hereinto.

Enclosing the optical fiber is a first tubular member 30, often referred to as a core tube. The tubular member 30 generally is made of plastic material. The material of the core tube 30 desirably is one which resists degradation caused by exposure to high temperatures. Such a material may be polybutylene terephthalate (PBT), HALAR® fluoropolymer plastic material available from the Ausimont Company, ULTEM® polyetherimide available from the General Electric Company, TEFLON® FEP fluorocarbon plastic, TEFLON® PFA fluorocarbon plastic material or TEFZEL® fluoropolymer plastic material. In a preferred embodiment, the tubular member has an inner diameter of about 0.33 inch and an outer diameter of about 0.41 inch.

The cable 20 of this invention also may include waterblocking provisions, such as, for example, a filling material 35 (see FIGS. 1 and 2). As seen in FIG. 2, the filling material 35 may be disposed in the tubular member 30 and fill any interstices among the ribbons 22-22 and among fibers 25-25 should the core include optical fibers in non-ribbon form. A suitable filling material 35 is a colloidal gel such as that which is disclosed in U.S. Pat. No. 4,701,016 which issued on Oct. 20, 1987 in the names of C. H. Gartside III, A. C. Levy, Bob J. Overton and Carl R. Taylor and which is incorporated by reference hereinto.

A colloidal gel typically is a semi-liquid substance comprising a thickening agent in a liquid carrier. All types of gelling agents form network structures in which the carrier is held by capillary forces. When a low stress is applied to a gel, the material acts substantially solid-like, but if the stress is above critical value, the material flows and the viscosity decreases rapidly, a behavior frequently described as thixotropic.

Colloidal gels have been used as communication cable filling compounds. In optical fiber cables, it is essential that, in addition to waterblocking, the filling gel maintains the optical fibers in a low stress state so that signal attenuation is minimized. Whereas the shear modulus has been considered the prime variable for optimizing performance of optical fiber cable filling compounds, a further parameter, the critical stress at which the gel yields, must be controlled.

A grease composition comprising oil, colloidal particle filler, and, optionally, a bleed inhibitor is disclosed in the above-identified Gartside, et al. U.S. Pat. No. 4,701,016. The grease typically has a critical yield stress below 140 Pa at 20° C., preferably below 70, or 35 Pa for some applications, and a shear modulus which is less than about 13 kPA at 20° C. Suitable compositions comprise 77 to 95% b.w. of ASTM type 103, 104A or 104B paraffinic or naphthenic oil, or polybutene oil; 2 to 15% b.w. of hydrophobic or hydrophilic fumed silica; and optionally, up to 15% b.w. of styrene-rubber or styrene-rubber styrene block copolymer, or semiliquid rubber.

Another composition of matter which is suitable for filling the core 21 is disclosed in application Ser. No. 07/691,770 which was filed on Apr. 26, 1991 in the name of C. F. Tu, now allowed and which is incorporated by reference hereinto.

About the core tube or tubular member 30 is disposed a second tubular member 40 which is a hermetic sealing member (see FIGS. 1 and 2) and which is adapted to seal the core from the entry of moisture. Preferred is a tubular member which is made of stainless steel. Typically, a stainless steel tube is made by forming a tube about an advancing cable core from a flat tape of metallic material an a manufacturing line to form a longitudinal seam which then is welded. Subsequently, the tube is drawn down about the advancing core 21 which is being moved along the manufacturing line.

Figure 3:
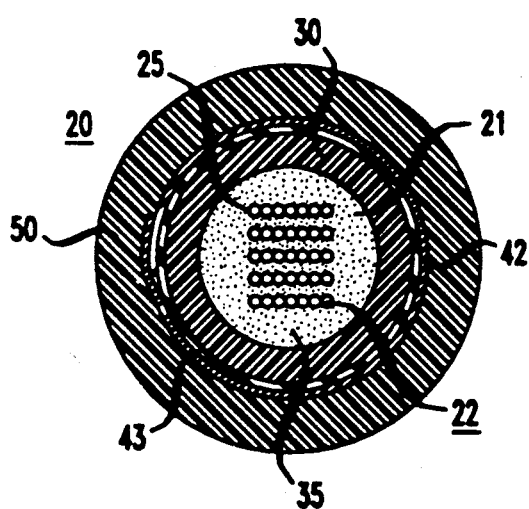
FIG. 3 is a cross-sectional view of an alternative embodiment of the cable of FIG. 1.

In one embodiment (See FIG. 3), a hermetic tubular member 42 is made fom a stainless steel tape which is corrugated to provide flexibility. The thickness of the tape from which the corrugated tubular member is made preferably is in the range of about 0.010 to 0.020 inch. Interposed between the corrugated tubular member 42 and the first tubular member 30 may be a layer 43 of cellular material such as a foamed polymeric material, for example, which has a thickness in the range of about 0.010 to 0.020 inch and which is effective to cushion the first tubular member during the formation of the corrugated metallic tape thereabout. In the alternative, the layer 43 may comprise a waterblocking member such as a laminate comprising two tapes having a superabsorbent polymeric material in power form therebetween.

The hermetic sealing member 40 or 42 is effective to prevent moisture from steam, for example, reaching the cable core. Moisture can have a deleterious effect on optical fiber because of hydrogen generation, for example.

A hermetic seal which includes an outer metallic layer comprising common steel, lead or aluminum is not deemed altogether satisfactory because they most likely will cause problems in the performance of the optical fiber. When the cable contacts water or when moisture inside the cable contacts the aluminum, for example, reactions between the moisture and the aluminum may result in the generation of hydrogen.

Hydrogen-induced attenuation at both the 1310 nm and 1550 nm single mode operating wavelengths of optical fiber, as well as in multimode optical fibers, has been observed in installed, armored underwater optical cables. Studies have shown that even when the core portion itself of optical fiber is not exposed to water, added loss can occur.

Hydrogen may be generated by self-corrosion of metals. All metals, except perhaps the noble metals, e.g. gold and platinum, have some finite corrosion rate in natural environments. When a metal corrodes, the surface is covered by micro/macroscopic cells where an anodic (oxidation) reaction occurs, i.e. corrosion of the metal, but the surface also is covered by micro/macroscopic cells where a cathodic (reduction) reaction takes place. In steam environments, this cathodic reaction can produce deleterious hydrogen molecules. In order for corrosion to occur, a cathodic reaction must occur to consume the electrons liberated in a corrosion reaction, otherwise the corrosion reaction cannot take place. Metals characterized by a relatively high chemical or electrochemical reactivity are referred to as active metals, and will be more likely to produce hydrogen than a metal characterized by a relatively low chemical or electrochemical reactivity.

The foregoing problem has been overcome by the optical fiber cable of this invention. Advantageously, the sheath system includes a hermetic seal which comprises a tubular member which is made of a metal characterized by a relatively low electrochemical reactivity. In a preferred embodiment, the second tubular member 40 or 42 is made of stainless steel having a sealed seam. Such an arrangement prevents the ingress of moisture from the superheated steam and consequent generation of hydrogen. Stainless steel is a metal which is characterized by a relatively low electrochemical reactivity. As such it resists corrosion and pitting. Also, the second tubular member provides suitable mechanical strenth for the cable 20, A suitable alternative to the stainless steel hermetic sealing member is copper, which does not react to form hydrogen.

Disposed about the hermetic sealing, tubular member 40 is an outer jacket 50. The outer jacket 50, as is the tubular member 30, preferably is made of a plastic material which can withstand exposure to steam environments. Such a material may be TEFZEL®, TEFLON® FEP, TEFLON® PFA or HALAR® plastic material, for example.

Advantageously, the cable 20 has an outer diameter of only about 0.55 inch. The inner diameter of the tubular member 30 is 0.33 inch and the hermetic sealing member may have a thickness of about 0.025 inch with an outer diameter of about 0.46 inch. Notwithstanding its small outer diameter, the cable 20 is resistant to high temperature, high humidity and high velocity steam.

Figure 4:
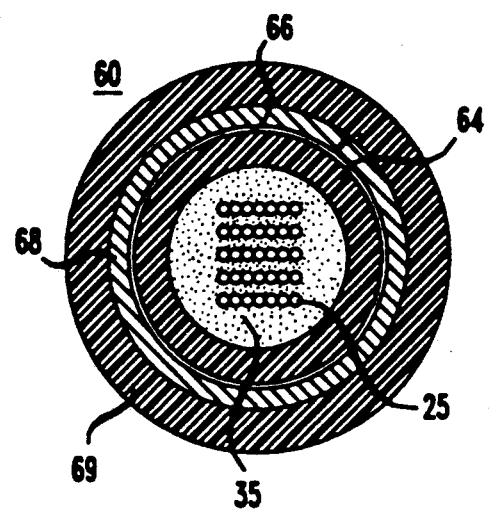
FIG. 4 is an end cross-sectional view of a preferred embodiment of a steam-resistant cable having a filled core.

In FIG. 4 is shown a preferred embodiment of cable of this invention. A cable 60 includes a core comprising a plurality of the ribbons 22-22 of optical fibers 25-25 disposed within a tubular member 64 which is made of the same material as the tubular member 30 in FIG. 1. The core may be filled with a waterblocking material 35 such as that described earlier with respect to the cable 20.

Disposed about the tubular member 64 is a waterblocking member 66. The waterblocking member may be a laminate comprising two tapes having a superabsorbent polymer in powder form disposed between the tapes or it may be a superabsorbent waterblocking yarn. A suitable waterblocking yarn is disclosed in U.S. Pat. No. 4,815,813 which issued on Mar. 28, 1989 in the names of C. J. Arroyo, H. P. Debban, Jr. and W. J. Paucke. In another embodiment, the waterblocking member 66 may comprise a suitable tape which has been impregnated with a superabsorbent material. See U.S. Pat. No. 4,867,526 which issrued on Sep. 19, 1989 in the name of C. J. Arroyo. About the waterblocking member 66 is disposed a hermetic sealing member 68 which as in the cable 20 is comprised of a metal such as stainless steel which is characterized by a low electrochemical reactivity. The hermetic sealing member 68 as shown has been formed from a corrugated tape of stainless steel but as in the embodiment depicted in FIG. 3, the hermetic sealing member may be formed from a flat tape. An outer jacket 69 is disposed about the hermetic sealing member 68 and comprises a plastic material such as the plastic material of the outer jacket 50 in the embodiment shown in FIG. 2.

Figure 5:
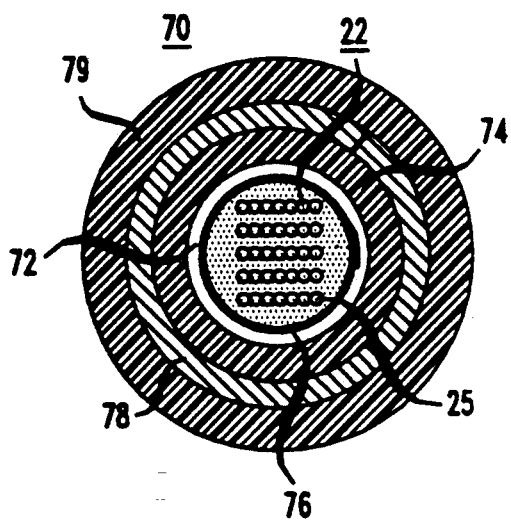
FIG. 5 is an end cross-sectional view of a ribbon cable having a different waterblocking member in a core of the cable.

Other embodiments include a cable 70 which is disposed in FIG. 5. The cable 70 includes a core 72 comprising one or more optical fiber ribbons 22-22 which are disposed in a tubular member 74. The tubular member 74 is made of any of the same materials comprising the tubular member 30. About the ribbons 22-22 within the tubular member 74 is wrapped a waterblocking member 76. The waterblocking member 76 may be a laminate comprised of two tapes having a superabsorbent polymer in powder form disposed therebetween or it may comprise an impregnated tape or superabsorbent waterblocking yarn such as those described earlier herein. A hermetic sealing member 78 which in the preferred embodiment is comprised of stainless steel is disposed about the tubular member 74 and has a sealed seam. The hermetic sealing member 78 may be made from a flat or corrugated tape which in the preferred embodiment is made of stainless steel. A jacket 79 which is comprised of one of the materials of which the jacket 50 is comprises is disposed about the hermetic sealing member 78. In this embodiment, there is no filling material in the core; instead, a waterblocking member in the form of powder, a tape or yarns is wrapped about the transmission media to arrest the longitudinal movement of water and to prevent water from reaching the transmission media.

Figure 6:
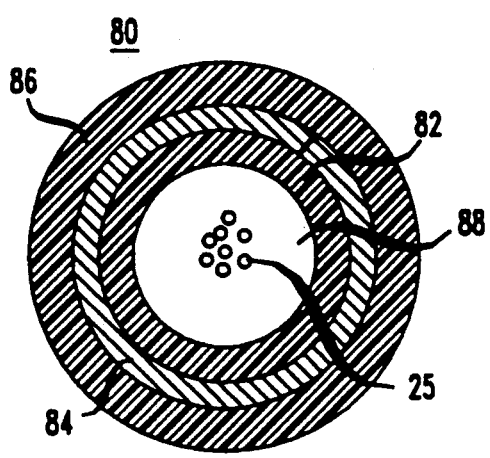
FIG. 6 is an end cross sectional view of a cable having optical fibers in non-ribbon form disposed in a core.

A further embodiment is depicted in FIG. 6. A steam-resistant cable 80 includes a core tube in the form of a tubular member 82, a corrugated or non-corrugated hermetic sealing member 84 and an outer jacket 86. The tubular member 82, hermetic sealing member 84 and jacket 86 may be similar in structure and composition to their counterparts in FIG. 1. However, in a core 88 of the embodiment of FIG. 6 are disposed a plurality of optical fibers 25-25 which may be loosely disposed or which may be assembled together and bound or arranged in groups each of which is bound with a binder. Such a core is described in U.S. Pat. No. 4,826,278 which issued on May 2, 1989 in the names of C. H. Gartside, III, P. D. Patel and A. J. Panuska and which is incorporated by reference hereinto. In the embodiment depicted in FIG. 6, the length of each fiber exceeds the length of the tubular member 82 such as, for example, by one per cent. In the embodiments of FIGS. 1-5, the fiber lengths exceed the length of the core tube because the ribbons are undulated. Also, the ratio of the total cross-sectional area of the coated optical fibers within the tubular member 82 to the cross-sectional area within the tubular member is no greater than about 0.5.

The steam-resistant cables of FIGS. 5 and 6 are suited for use in buildings and include what is referred to as an air core cable, that is, one in which the core does not include a filling composition of matter such as that described hereinbefore and included in the cable of FIG. 1.

Figure 7:
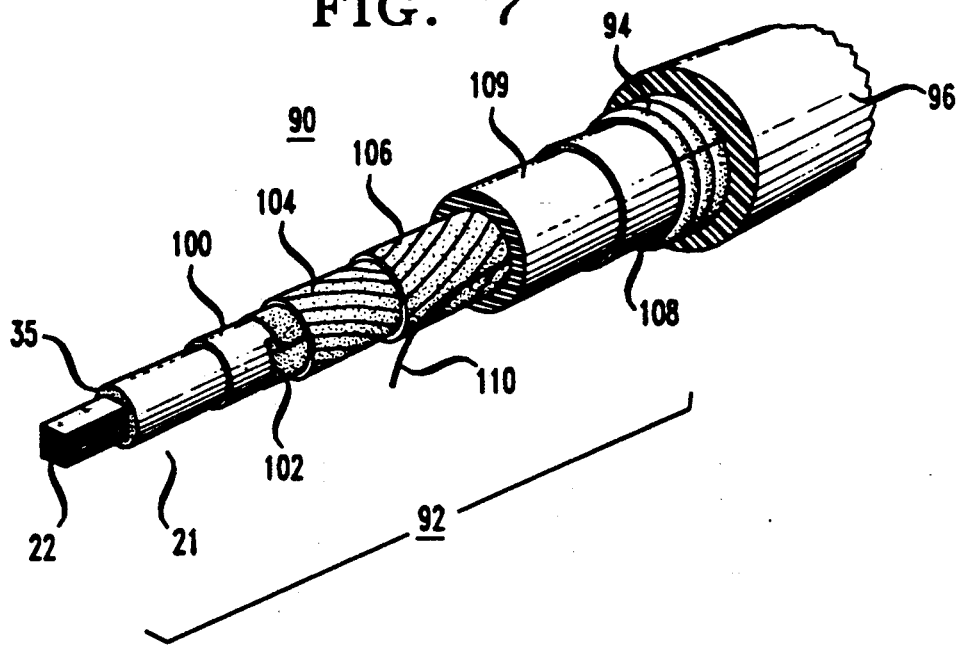
FIG. 7 is a perspective view of a steam-resistant cable which comprises a commercially available optical fiber cable which has been provided with an oversheath.

A still further alternate embodiment is depicted in FIG. 7. In it, a cable which is designated generally by the numeral 90 includes a cable which is designated generally by the numeral 92 and which is provided with an oversheath comprising a corrugated metallic, hermetic sealing, tubular member 94 which has a welded longitudinally extending butt seam and an outer jacket 96.

The cable 92 which is provided with an oversheath may be any of several commercially available cables such as the one shown in FIG. 7. In FIG. 7, the cable 92 includes a core 21, a tubular member 100 in which may be disposed a stack of optical fiber ribbons 22-22 and a filling composition of matter 35 such as that used in the cable depicted in FIG. 1. About the outwardly facing surface of the tubular member 100 is disposed a waterblocking member 102 which may comprise a laminate or an impregnated tape or waterblocking yarn as described hereinbefore. Disposed about the waterblocking member 102 are two layers 104 and 106 of strength members with the strength members in the two layers being wound in opposite helical directions. Interposed between the hermetic sealing member 94 and the outer layer 106 of strength members are a layer of 108 of cellular material such as a foamed polymeric material, for example, or a waterblocking layer and an inner jacket 109. A rip cord 110 extends longitudinally within the layer of cellular material. The tubular member 100 of the cable 90 is comprised of a fire-resistant material. Preferably, the material of the tubular member 100 is the same as that of the tubular member 30 of the cable 20 of FIGS. 1 and 2.

In the alternative, the cable 92 may be one such as that disclosed and claimed in U.S. Pat. No. 4,844,575 which issued on Jul. 4, 1989 in the names of M. D. Kinard, A. J. Panuska, M. R. Reynolds, M. R. Santana and G. H. Webster, for example. Also, the core may comprise a plurality of optical fibers 25-25 which may be arranged in units such as is shown in aforementioned U.S. Pat. No. 4,826,278.

The embodiment of FIG. 7 provides additional resistance to penetration by moisture in steam environments and additional strength through the layers 104 and 106. The overall outer diameter of the cable 90 is in the range of from about 0.8 to 1.0 inch.

Advantageously, the cables of this invention are steam-resistant and particularly suited for placement adjacent to steam lines in buildings or underground outside buildings, for example. The cables disclosed resist degradation during exposure to high temperature, high moisture and high velocity steam environments. Of course, even though the invention has been described in terms of an optical fiber cable, the invention also includes steam-resistant metallic conductor cables.

It is to be understood that the above-described arrangements are simply illustrative of the invention. Other arrangements may be devised by those skilled in the art which will embody the principles of the invention and fall within the spirit and scope thereof.

We claim:

1. A steam-resistant cable, said cable comprising
   a core comprising at least one transmission medium;
   a first tubular member in which is disposed said core and which comprises a plastic material which resists degradation when exposed to relatively high temperatures;
   a second tubular member which is disposed about said first tubular member, which has a sealed seam and which comprises a metallic material having a relatively low chemical or electrochemical reactivity; and
   a jacket comprising a plastic material and being disposed about said second tubular member.

2. The steam-resistant cable of claim 1, wherein said transmission medium is optical fiber.

3. The steam-resistant cable of claim 2, wherein said second tubular member comprises a stainless steel material and said second tubular member includes a sealed longitudinally extending seam.

4. The steam-resistant optical fiber cable of claim 2, wherein said core comprises at least one optical fiber ribbon which comprises a plurality of optical fibers which are disposed in a planar array.

5. The steam-resistant optical fiber cable of claim 2, wherein the length of each optical fiber transmission medium exceeds the length of said first tubular member by as much as one percent.

6. The steam-resistant optical fiber cable of claim 2, wherein said plastic material of said first tubular member comprises polybutylene terephthalate.

7. The steam-resistant optical fiber cable of claim 2, wherein said second tubular member is corrugated.

8. The steam-resistant optical fiber cable of claim 2, which also includes a waterblocking material which is disposed within said first tubular member.

9. The steam-resistant optical fiber cable of claim 8, wherein said waterblocking material includes a filling material which is disposed within said first tubular member.

10. The steam-resistant optical fiber cable of claim 9, wherein said filling material has a critical yield stress which is not greater than about 70 Pa at 20° C. and a shear modulus less than about 13 kPa at 20° C.

11. The steam-resistant optical fiber core of claim 10, wherein the filling material is a composition of matter which comprises:
   (a) 77 to 95% by weight of an oil, selected from the group consisting of:
      (i) paraffinic oil having a minimum specific gravity of about 0.86 and a pour point less than −4° C., and being of ASTM type 103, 104A or 104B;
      (ii) naphthenic oil having a minimum specific gravity of about 0.86 and pour point less than −4° C., and being of ASTM type 103, 104A, or 104B;
      (iii) polybutene oil having a minimum specific gravity of about 0.83 and a pour point less than 18° C.; and
      (iv) any mixture thereof; and
   (b) 2 to 15% by weight of hydrophobic fumed silica colloidal particles.

12. The steam-resistant optical fiber cable of claim 10, wherein the filling material is a composition of matter comprising:
   (a) 77 to 95% by weight of an oil selected from the group consisting of:
      (i) paraffinic oil having a minimum specific gravity of about 0.86 and a pour point of less than −4° C., and being of ASTM type 103, 104A or 104B;
      (ii) naphthenic oil having a minimum specific gravity of about 0.86 and pour point of less than −4° C., and being ASTM type 103, 104A or 104B;
      (iii) polybutene oil having a minimum specific gravity of about 0.83 and a pour point of less than 18° C.;
      (iv) triglyceride-based vegetable oil,
      (v) polypropylene oil,
      (vi) chlorinated paraffin oil having a chlorine content between about 30 and 75% by weight and a viscosity at 25° C. of between 100 and 10,000 cps, and
      (vii) polymerized esters; and
      (viii) any mixture thereof; and
   (b) 2 to 15% by weight colloidal particles selected from the group consisting of hydrophobic fumed silica, hydrophilic fumed silica, precipitated silica, and clay, the colloidal particles having a BET surface area in the range from about 50 to about 400 m²/g.

13. The steam-resistant cable of claim 2, which also includes a waterblocking member which is interposed between said first tubular member and said jacket.

14. The steam-resistant cable of claim 13, wherein said waterblocking member comprises a laminate which includes a superabsorbent polymeric material.

15. The steam-resistant cable of claim 13, wherein said waterblocking member comprises a tape which is impregnated with a superabsorbent polymeric material and which has been wrapped about said first tubular member.

16. The steam-resistant cable of claim 13, wherein said waterblocking member comprises a superabsorbent yarn material.

17. The steam-resistant cable of claim 2, wherein said core includes a plurality of coated optical fibers, each having a length which exceeds the length of said first tubular member.

18. The steam-resistant cable of claim 17, wherein the ratio of the cross sectional areas of the optical fiber disposed in the first tubular member to the cross sectional area within the first tubular member is less than 0.5.

19. The steam-resistant cable of claim 2, wherein said core comprises a waterblocking member which comprises a laminate and which has been wrapped about said at least one optical fiber transmission medium.

20. The steam-resistant cable of claim 2, wherein said core comprises a waterblocking yarn which has been wrapped about said at least one optical fiber transmission medium.

21. The steam-resistant cable of claim 2, wherein said core comprises a waterblocking member comprising a tape which has been impregnated with a superabsorbent polymeric material and which has been wrapped about said at least one optical fiber transmission medium.

22. The steam-resistant cable of claim 2, wherein said first tubular member comprises a material which is selected from the group consisting of a polyetherimide and a fluoropolymer.

23. The steam-resistant cable of claim 2, wherein said jacket comprises a material which is selected from the group consisting of a polyetherimide and a fluoropolymer.

24. The steam-resistant cable of claim 2, wherein said jacket is an outer jacket and which also includes a strength member system and an inner jacket which are interposed between said first and second tubular members.

25. The steam-resistant cable of claim 2, wherein said jacket is an outer jacket and wherein said second tubular member and said outer jacket comprise an oversheath which is disposed about a cable which comprises said core, said first tubular member, a strength member system and a jacket.

* * * * *